United States Patent
Stichweh et al.

(10) Patent No.: US 11,316,451 B2
(45) Date of Patent: Apr. 26, 2022

(54) METHOD FOR DETERMINING CURRENT-DEPENDENT AND/OR ROTATIONAL ANGLE POSITION-DEPENDENT CHARACTERISTIC VARIABLES OF AN ELECTRICAL MACHINE, AND FREQUENCY CONVERTER

(71) Applicant: Lenze Automation GmbH, Aerzen (DE)

(72) Inventors: Heiko Stichweh, Springe (DE); Gennadi Boehm, Wittingen (DE)

(73) Assignee: Lenze Automation GmbH, Aerzen (DE)

( * ) Notice: Subject to any disclaimer, the term of this patent is extended or adjusted under 35 U.S.C. 154(b) by 749 days.

(21) Appl. No.: 15/739,300

(22) PCT Filed: Jun. 24, 2016

(86) PCT No.: PCT/EP2016/064726
§ 371 (c)(1),
(2) Date: Dec. 22, 2017

(87) PCT Pub. No.: WO2016/207383
PCT Pub. Date: Dec. 29, 2016

(65) Prior Publication Data
US 2018/0198391 A1 Jul. 12, 2018

(30) Foreign Application Priority Data
Jun. 25, 2015 (DE) .................... 10 2015 211 863.0

(51) Int. Cl.
*H02P 6/185* (2016.01)
*H02P 21/00* (2016.01)
(Continued)

(52) U.S. Cl.
CPC ............ *H02P 6/185* (2013.01); *H02P 6/22* (2013.01); *H02P 21/0025* (2013.01); *H02P 21/18* (2016.02)

(58) Field of Classification Search
CPC .. H02P 6/185; H02P 21/18; H02P 6/22; H02P 21/005
(Continued)

(56) References Cited

U.S. PATENT DOCUMENTS 4,920,306 A * 4/1990 Mard ................. H02P 21/30
318/722
6,005,364 A * 12/1999 Acarnley ............. H02P 6/18
318/632
(Continued)

FOREIGN PATENT DOCUMENTS

| CN | 101174154 B | * | 7/2012 | ............. H02P 7/00 |
| EP | 2 555 420 A1 | | 2/2013 | |
| EP | 2 566 045 A2 | | 3/2013 | |

OTHER PUBLICATIONS

International Search Report (PCT/ISA/210) issued in PCT Application No. PCT/EP2016/064726 dated Oct. 10, 2016 with English translation (seven pages).
(Continued)

*Primary Examiner* — Muhammad S Islam
*Assistant Examiner* — Devon A Joseph
(74) *Attorney, Agent, or Firm* — Crowell & Moring LLP (57) ABSTRACT

A method for determining current-dependent and/or rotational angle position-dependent characteristic variables of an electrical machine by setting a rotational angle position of blocking a rotor, forming a series current desired value using a series current desired value alternating signal which changes periodically and/or forming a parallel current desired value using a parallel current desired value alternating signal which changes periodically, regulating a series
(Continued)

current using the series current desired value and/or a parallel current using the parallel current desired value, measuring phase currents of the electrical machine and determining an established series current and/or an established parallel current, producing series setting voltage coefficients and series current coefficients and/or parallel setting voltage coefficients and parallel current coefficients using a discrete Fourier transform algorithm, and calculating characteristic variables on the basis of series setting voltage coefficients and series current coefficients and/or parallel setting voltage coefficients and parallel current coefficients.

13 Claims, 5 Drawing Sheets

(51) Int. Cl.
*H02P 21/18* (2016.01)
*H02P 6/22* (2006.01)

(58) Field of Classification Search
USPC .................................................. 318/400.33
See application file for complete search history.

(56) References Cited

U.S. PATENT DOCUMENTS

| | | | |
|---|---|---|---|
| 9,379,654 B2 | 6/2016 | Peretti et al. | |
| 2005/0029972 A1* | 2/2005 | Imai | H02P 21/18 318/400.04 |
| 2007/0108771 A1* | 5/2007 | Jones | H02P 9/102 290/44 |
| 2007/0121354 A1* | 5/2007 | Jones | H02P 9/102 363/47 |
| 2008/0116835 A1* | 5/2008 | Tsui | H02P 8/32 318/615 |
| 2010/0045218 A1 | 2/2010 | Tomigashi | |
| 2011/0068724 A1* | 3/2011 | Henderson | H02P 21/141 318/400.21 |
| 2013/0049656 A1* | 2/2013 | Yasui | H02P 21/00 318/400.02 |
| 2014/0145655 A1* | 5/2014 | Peretti | H02P 21/16 318/400.02 |
| 2018/0248504 A1* | 8/2018 | Lin | H02P 21/22 |
| 2019/0097549 A1* | 3/2019 | Colby | H02P 1/022 |

OTHER PUBLICATIONS

German-language Written Opinion (PCT/ISA/237) issued in PCT Application No. PCT/EP2016/064726 dated Oct. 10, 2016 (six pages).

Weigel et al., "Acquisition of a permanent magnet linear synchronous motor's electrical parameters and dead beat current control considering saturation", Electric Machines and Drives Conference, Jun. 1, 2003, pp. 791-797, vol. 2, No. 1, IEEE International, XP010643442.

Zhu et al., "Compensation for Rotor Position Estimation Error due to Cross-Coupling Magnetic Saturation in Signal Injection Based Sensorless Control of PM Brushless AC Motors", Electric Machines & Drives Conference, May 1, 2007, pp. 208-213, XP031114836.

Functional knowledge; Automation, Nov. 28-30, 2000, 20 pages, Prof. Dr.-Ing. Klaus Bender, TU Munich et al.

* cited by examiner

Excitation of the direct-axis flux

↔ Excitation in d-axis $L_{dd}$ and $L_{qd}$

↔ Excitation in q-axis $L_{dq}$ and $L_{qq}$

Excitation of the quadrature-axis flux

↔ Excitation in d-axis $L_{dd}$ and $L_{qd}$

↔ Excitation in q-axis $L_{dq}$ and $L_{qq}$

METHOD FOR DETERMINING CURRENT-DEPENDENT AND/OR ROTATIONAL ANGLE POSITION-DEPENDENT CHARACTERISTIC VARIABLES OF AN ELECTRICAL MACHINE, AND FREQUENCY CONVERTER

BACKGROUND AND SUMMARY OF THE INVENTION

The invention relates to a method for determining current-dependent and/or rotational-angle-position-dependent characteristic variables of an electric machine, in particular carried out by means of a frequency converter, and to a frequency converter.

Electric machines (electric motors) in the form of permanent-magnet synchronous machines (PMSMs) and synchronous reluctance machines (SynRMs) offer considerable advantages over the nowadays widespread asynchronous and induction machines with respect to their energy efficiency, in particular in the partial load range and partial rotational speed range, as well as power density and synchronism in terms of rotational speed. However, cost-effective, encoderless operation of these synchronously operating electric motors requires very precise knowledge of the properties of the electric motors in the form of characteristic-variable-based equivalent circuit data. Characteristic variables such as inductances typically change with the current or depending on the rotor position on account of the saturation-dependent properties of the electric motors.

The invention is based on the object of providing a method for determining or identifying current-dependent and/or rotational-angle-position-dependent characteristic variables of an electric machine and a frequency converter.

The invention achieves this object by a method for determining current-dependent and/or rotational-angle-position-dependent characteristic variables of an electric machine, in particular for being carried out by an inverter, having the following steps: a) setting a rotational angle position of a rotor of the electric machine and subsequently locking the rotor, b) forming a direct-axis-current setpoint value by adding a direct-axis-current setpoint-value operating point) ($I_{d,O}^{k}$) and a direct-axis-current setpoint-value AC signal ($I_{d,RF}^{k}$), wherein the direct-axis-current setpoint-value AC signal ($I_{d,RF}^{k}$) changes periodically at a direct-axis-current setpoint-value frequency, and/or forming a quadrature-axis-current setpoint value by adding a quadrature-axis-current setpoint-value operating point ($I_{q,O}^{k}$) and a quadrature-axis-current setpoint-value AC signal ($I_{q,RF}^{k}$) wherein the quadrature-axis-current setpoint-value AC signal ($I_{q,RF}^{k}$) changes periodically at a quadrature-axis-current setpoint-value frequency, c) regulating a direct-axis current ($i_d$) to the direct-axis-current setpoint value and/or regulating a quadrature-axis current ($i_q$) to the quadrature-axis-current setpoint value, wherein, for the purpose of the regulation, manipulated variables in the form of a direct-axis manipulated voltage ($u_d^k$) and/or a quadrature-axis manipulated voltage ($u_q^k$) are generated and impressed into motor phases of the electric machine, d) measuring phase currents ($i_{u,act}$, $i_{v,act}$, $i_{w,act}$) of the electric machine and determining an ensuing direct-axis current ($i_{d,act}$) and/or an ensuing quadrature-axis current ($i_{q,act}$) from the measured phase currents ($i_{u,act}$, $i_{v,act}$, $i_{w,act}$), e) applying a discrete Fourier transform (DFT) algorithm or a Goertzel algorithm to the direct-axis manipulated voltage ($u_d^k$) and to the determined direct-axis current ($i_{d,act}$) to generate direct-axis manipulated-voltage coefficients and direct-axis-current coefficients and/or applying the DFT algorithm or the Goertzel algorithm to the quadrature-axis manipulated voltage ($u_q^k$) and to the determined quadrature-axis current ($i_{q,act}$) to generate quadrature-axis manipulated-voltage coefficients and quadrature-axis-current coefficients, and f) calculating the characteristic variables depending on the direct-axis manipulated-voltage coefficients and the direct-axis-current coefficients and/or on the quadrature-axis manipulated-voltage coefficients and the quadrature-axis-current coefficients. The invention further achieves this object by a frequency converter having a control unit, which is configured to carry out the above-described method.

The method serves to determine current-dependent and/or rotational-angle-position-dependent characteristic variables of an electric machine.

The characteristic variables can be further used, for example, for model-based, encoderless regulation of the PMSMs or SynRMs and for optimum-efficiency or optimum-power regulation (Maximum Torque per Ampere Control or MTPA) or for checking the properties of the motor. The information can furthermore be used for improved feed-forward control of the current setpoint value.

First of all, a rotational angle position of a rotor of the electric machine is set. After the desired rotational angle position has been reached, the rotor is locked, in particular mechanically, such that the rotor can no longer change its rotational angle position. Said locking can be realized, for example, using a service brake or a holding brake.

A direct-axis-current setpoint value is subsequently formed by adding a direct-axis-current setpoint-value operating point and a direct-axis-current setpoint-value AC signal, wherein the direct-axis-current setpoint-value AC signal changes periodically at a direct-axis-current setpoint-value frequency and the direct-axis-current setpoint-value operating point remains constant at least during certain periods. Alternatively or in addition, a quadrature-axis-current setpoint value is formed by adding a quadrature-axis-current setpoint-value operating point and a quadrature-axis-current setpoint-value AC signal, wherein the quadrature-axis-current setpoint-value AC signal changes periodically at a quadrature-axis-current setpoint-value frequency and the quadrature-axis-current setpoint-value operating point remains constant at least during certain periods. The periodic AC signals, which can be embodied, for example, to be sinusoidal, serve here to identify the differential impedance or inductance in the operating point defined by the constant current components.

Phase currents (currents in the motor phases) of the electric machine are now measured and an ensuing direct-axis current and/or an ensuing quadrature-axis current is/are determined conventionally from the measured phase currents and a measured or estimated rotor flux position. In this respect, reference is also made to the relevant technical literature.

The direct-axis current $i_d$ is now regulated conventionally to the direct-axis-current setpoint value and/or the quadrature-axis current $i_q$ is regulated conventionally to the quadrature-axis-current setpoint value, wherein conventionally, for the purpose of the regulation, manipulated variables in the form of a direct-axis manipulated voltage and/or a quadrature-axis manipulated voltage are generated and impressed into motor phases of the electric machine. In this respect, reference is also made to the relevant technical literature.

In order to realize both a good reference response of the current regulator with regard to the operating point and also with regard to the RF component as well as good decoupling between the direct-axis and quadrature-axis branch, the use of a PI-P resonant regulator lends itself both to the quadrature-axis and the direct-axis current.

The impressed direct-axis and quadrature-axis manipulated voltages and the determined direct-axis and quadrature-axis currents can furthermore be used to determine the differential impedance of the machine in the set operating point. If the manipulated voltages or the measured currents exhibit interfering noise components or other interfering signal components, a filter (for example a band-pass filter of the $2^{nd}$ order) can be used for the purpose of filtering. It is important for the filter to be applied to all of the manipulated voltages and direct-axis and quadrature-axis currents included in the calculation so that the phase shift caused by the filter and the amplitude attenuation occur to the same extent for all variables.

A discrete Fourier transform (DFT) algorithm is applied respectively to the unfiltered or filtered manipulated voltages and to the unfiltered or filtered currents, the result of which is the complex Fourier coefficients for direct-axis and quadrature-axis current and direct-axis and quadrature-axis manipulated voltage depending on the frequency. When an RF signal at a fixed frequency (for example a sinusoidal test signal) is used for excitation, the discrete Fourier transform can be replaced by the substantially simpler Goertzel algorithm, which can calculate the Fourier coefficients for current and voltage for the desired excitation frequency with considerably less outlay in terms of computation time and storage requirements.

Finally, the characteristic variables are calculated depending on the direct-axis manipulated-voltage coefficients and the direct-axis-current coefficients and/or the quadrature-axis manipulated-voltage coefficients and the quadrature-axis-current coefficients. The impedance Z for the operating point may be included in these characteristic variables. The differential inductances Ldd, Lqq, Ldq and Lqd can be obtained from the impedance by a separate observation of the imaginary and real component of the ohmic resistance and taking the excitation frequency into account.

In step b), the direct-axis-current setpoint-value operating point can be changed and/or the quadrature-axis-current setpoint-value operating point can be changed, wherein steps c) to f) are repeated in the case of a changed direct-axis-current setpoint-value operating point and/or in the case of a changed quadrature-axis-current setpoint-value operating point.

The direct-axis current $i_d$ can be regulated to the direct-axis-current setpoint value and/or the quadrature-axis current $i_q$ can be regulated to the quadrature-axis-current setpoint value based on regulation parameters for the current regulators, which regulation parameters are dependent on the direct-axis-current setpoint-value operating point and/or the quadrature-axis-current setpoint-value operating point. If, for example, a PI or a PI-P resonant regulator is used for regulating the current, said regulators can be set according to setting methods (for example absolute-value optimum) known from the literature. The characteristic variables (inductances) required for this method can be obtained, for example, from an operating point, which has already been identified beforehand and which differs only slightly from the operating point to be identified presently. In this way, stable and dynamic behavior of the current regulators can be ensured, for example, even in the case of SynRMs, whose differential inductance can sometimes change by a factor of 3 depending on the current.

The direct-axis-current setpoint-value operating point and/or the quadrature-axis-current setpoint-value operating point can be continuously changed in such a way that a change in the direct-axis current and/or in the quadrature-axis current does not exceed a prescribable threshold value. The threshold values for positive and negative direct-axis and quadrature-axis currents thus limit the field of the operating points or define the search space to be identified.

The characteristic variables can be calculated depending on a dead time of the inverter and/or depending on signal propagation times of filters that serve to measure the phase currents. The phase shift on the voltage signal resulting from the dead time can be used, for example, in the calculation of the impedance and erroneous calculation of the imaginary and real part of the impedance can thus be prevented.

In step a), the rotational angle position can be changed by releasing the locking and the rotor can subsequently be locked again in the case of a changed rotational angle position, wherein steps b) to f) are repeated in the case of a changed rotational angle position, in order to determine in this way the characteristic variables in a manner dependent on the rotational angle.

The current-dependent and/or rotational-angle-position-dependent characteristic variables can be selected from the following set of characteristic variables: differential (derived in accordance with the current) direct-axis inductance(s) $L_{dd}$, differential (derived in accordance with the current) quadrature-axis inductance(s) $L_{qq}$, cross-saturation $L_{dq}$ and $L_{qd}$, and resistances.

The impedances composed of inductance and resistance can also furthermore be used directly.

$$L_{dd}(i_d, i_q, \varphi) = \frac{\partial \psi_d(i_d, i_q, \varphi)}{\partial I_d}, L_{dq}(i_d, i_q, \varphi) = \frac{\partial \psi_d(i_d, i_q, \varphi)}{\partial I_q},$$

$$L_{qd}(i_d, i_q, \varphi) = \frac{\partial \psi_q(i_d, i_q, \varphi)}{\partial i_d}, L_{qq}(i_d, i_q, \varphi) = \frac{\partial \psi_q(i_d, i_q, \varphi)}{\partial i_q}.$$

To provide a better understanding, the voltage equations of a PMSM and a SynRM are illustrated in a simplified form. It should be noted in SynRMs that the permanent flux $\psi_{PM}$ is zero.

$$U_d = R_s \cdot I_d + L_{dd} \cdot \frac{dI_d}{dt} + L_{dq} \cdot \frac{dI_q}{dt} - \omega_{el} \cdot L_{sq} \cdot I_q$$

$$U_q = R_s \cdot I_q + L_{qd} \cdot \frac{dI_d}{dt} + L_{qq} \cdot \frac{dI_q}{dt} + \omega_{el} \cdot L_{sd} \cdot I_d + \omega_{el} \cdot \psi_{PM}$$

Current-dependent and/or location-dependent flux linkages in the direct-axis direction and in the quadrature-axis direction Psi_d, Psi_q can be calculated from the calculated differential direct-axis inductances and quadrature-axis inductances Ldd, Lqq and from the calculated cross-saturation. In the case of permanent-magnet synchronous machines, this can be done, in particular, by taking into account the flux linkage in the direct-axis direction effected by the magnets.

$$\psi_d(i_d, i_q) = \int_0^{I_{d,max}} L_{dd}(i_d, i_q) di_d + \psi_{PM}$$

$$\psi_q(i_d, i_q) = \int_0^{I_{q,max}} L_{qq}(i_d, i_q) di_q$$

Current-dependent and/or location-dependent absolute inductances in the direct-axis direction and the quadrature-axis direction can be calculated from the flux linkages in the direct-axis direction and the quadrature-axis direction and from the associated direct-axis currents and quadrature-axis currents.

$$L_{sd}(i_d, i_q) = \frac{\psi_d(i_d, i_q)}{i_d}, L_{sq}(i_d, i_q) = \frac{\psi_q(i_d, i_q)}{i_q}$$

The direct-axis currents and/or the quadrature-axis currents obtained from the measurement of the phase currents can be filtered, for example band-pass filtered.

The electric machine can be a synchronous machine or a reluctance machine. The method can also be used for induction machines.

The frequency converter has a control unit, for example in the form of a microprocessor and associated software, which is configured to carry out a method that is described above. It goes without saying that the frequency converter has suitable measuring means for measuring the required variables.

The basic idea of the method consists in the characteristic variables or the equivalent circuit variables for each relevant operating point being determined. For this, in a SynRM or PMSM, which is firmly braked at a defined rotational angle position, different operating points, which are characterized by a constant direct-axis and quadrature-axis current, are approached. The differential impedances and inductances can subsequently be determined for the operating point by means of a test signal injection in the direct-axis and/or quadrature-axis direction. The absolute inductances and fluxes can subsequently be obtained from the differential variables on the basis of further mathematical calculations.

BRIEF DESCRIPTION OF THE DRAWINGS

The invention is described in detail below with reference to the drawings, in which.

DETAILED DESCRIPTION OF THE DRAWINGS

The method according to the invention makes it possible to identify the current-dependent equivalent circuit data or characteristic variables of a permanent-magnet synchronous machine, of a synchronous reluctance machine and/or of an induction machine. The method can be carried out without a position sensor. However, it is necessary to firmly brake the machine during the method at least during certain periods.

The method is based on the alternating injection of RF signals. The signal injection can take place, in principle, by means of RF voltage signals or by impressing an RF current into field-oriented coordinate systems. The description that follows is based on the impression of the RF current. Measurement takes places when the rotor is locked, wherein the position of the rotor is known or is estimated. The rotor position or the rotational angle position can be identified according to known methods. Iron losses are significant only at relatively high rotational speeds and can therefore be disregarded in the measurement of inductance when the machine is at a standstill.

Figure 1:
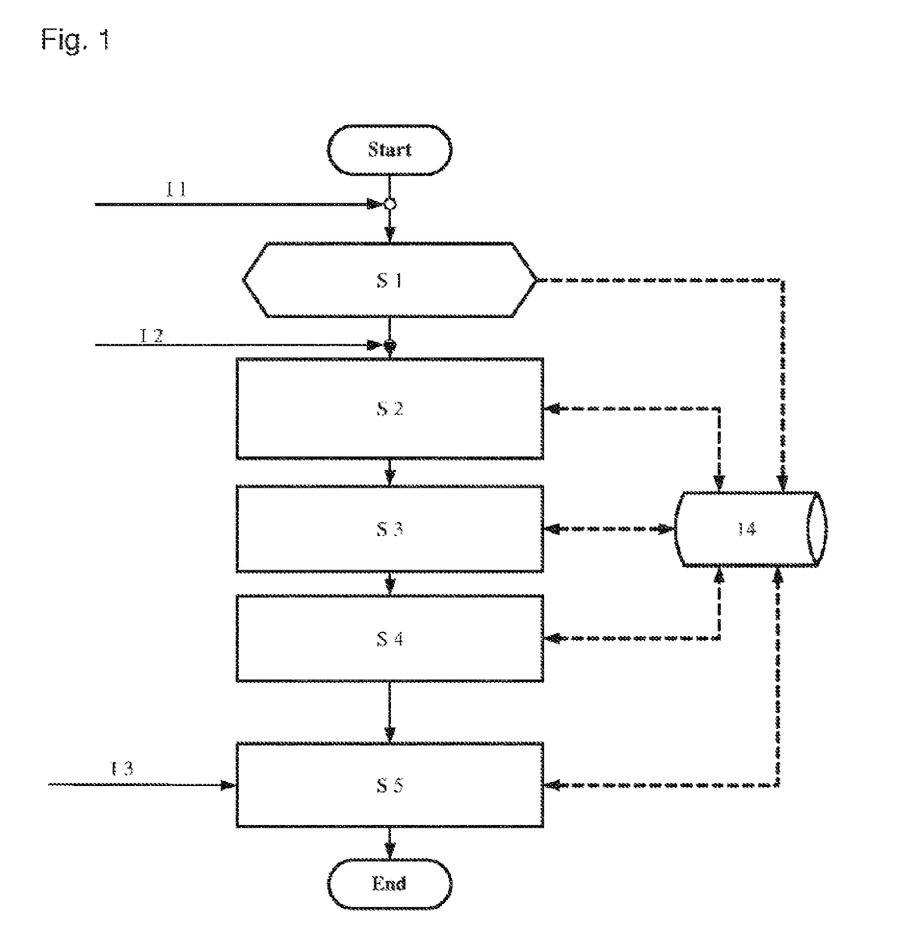
FIG. 1 shows a basic schematic structogram of a method according to the invention for determining current-dependent and/or rotational-angle-position-dependent characteristic variables of an electric machine.

FIG. 1 shows an overview of a structogram of a method according to the invention for determining current-dependent and/or rotational-angle-position-dependent characteristic variables in the form of differential direct-axis inductances $L_{dd}$, differential quadrature-axis inductances $L_{qq}$, cross-saturations $L_{dq}$ and $L_{qd}$ and optionally resistances or impedances.

With reference to FIG. 1, in an optional input step I1, the present regulators are first of all parameterized from measurement data. Furthermore, in I1, the operating points to be measured are specified.

Subsequently, in a step S1, a rotational angle position of the rotor of the electric machine, that is to say an orientation of the rotor, is set.

Subsequently, in an input step I2, the rotor of the electric machine is locked, with the result that the rotational angle position of the rotor can no longer be changed.

In a step S2, a winding resistance and an inverter characteristic curve are determined. Furthermore, the inductances are roughly determined by means of simple test signals (for example step responses). The insights obtained in this way are used to dimension the frequency of the later AC signal and to preset the regulating parameters of the current regulators.

In a step S3, the actual method for identifying the differential inductances, resistances and inductances takes place.

In a step S4, the flux linkages Psi_d and Psi_q and the absolute inductances are determined from the differential inductances.

In a step S5, a linkage of the permanent magnetic flux is determined taking into account a voltage constant ke, which is input in an input step I3.

The determined characteristic variables are stored in a database 14.

Figure 2:
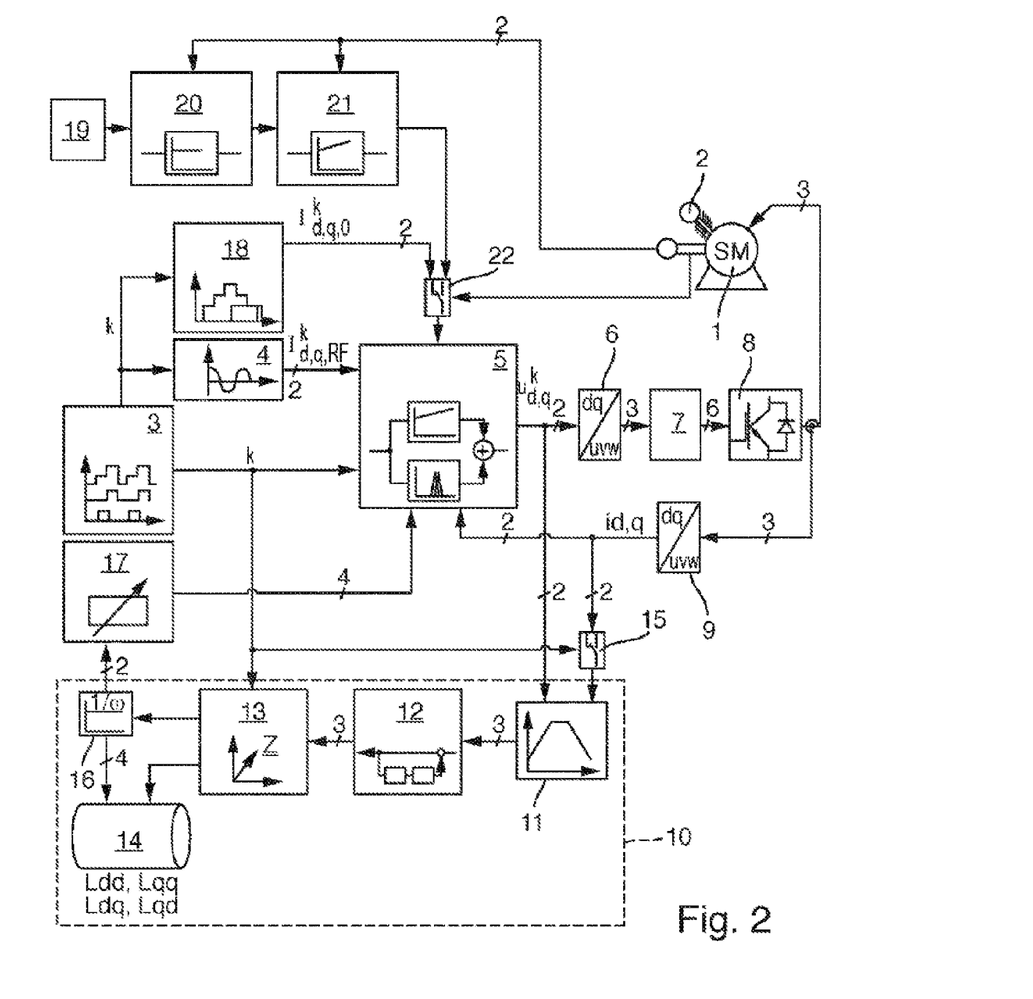
FIG. 2 shows a schematic block circuit diagram of a structure of the method according to the invention in greater detail for determining the current-dependent and/or rotational-angle-position-dependent characteristic variables.

FIG. 2 shows a detailed block circuit diagram of a structure of the method according to the invention.

A brake 2 serves to lock an electric machine 1 in the form of a synchronous machine, a reluctance machine or an inductance machine.

A state controller 3 serves to generate a state variable k. The state controller 3 in connection with setpoint-value generation means 18 serves to prescribe a direct-axis-current setpoint-value operating point $I_{d,O}^{k}$ and a quadrature-axis-current setpoint-value operating point $I_{q,O}^{k}$, each depending on the state k. The state k can assume integral values between 0 and 2.

An RF generator 4 receives the state k and generates—after the stationary operating point has been approached and the stationary currents have settled—either a direct-axis-current setpoint-value AC signal $i_{d,RF}^{k}$ or a quadrature-axis-current setpoint-value AC signal $i_{q,RF}^{k}$ depending on said state.

A current regulation means 5 receives the direct-axis-current setpoint-value operating point $I_{d,O}^{k}$, the quadrature-axis-current setpoint-value operating point $I_{q,O}^{k}$, the direct-axis-current setpoint-value AC signal $i_{d,RF}^{k}$, the quadrature-axis-current setpoint-value AC signal $i_{q,RF}^{k}$ and the state k. In the current regulation means 5, a direct-axis-current setpoint value is formed by adding the direct-axis-current setpoint-value operating point and the direct-axis-current setpoint-value AC signal and a quadrature-axis-current setpoint value is formed by adding the quadrature-axis-current setpoint-value operating point and the quadrature-axis-current setpoint-value AC signal. For clarification, reference is also made to FIG. 6. The current regulator can be embodied here, for example, as a PI or a PI-P resonant regulator and is tracked from operating point to operating point with respect to the regulator parameters thereof.

The current regulation means 5 regulates the direct-axis current $i_d$ to the direct-axis-current setpoint value and regulates the quadrature-axis current $i_q$ to the quadrature-axis-current setpoint value, wherein, for the purpose of the regulation, manipulated variables in the form of a direct-axis manipulated voltage $u_d^k$ and a quadrature-axis manipulated voltage $u_q^k$ are generated and impressed into motor phases of the electric machine 1. To this end, a transform of the field-oriented manipulated-voltage variables (dq system) is conventionally carried out into the α,β-system fixed to the stator and into the phase-voltage-based uvw system (for example for inverse Clarke transformation 6). The voltage can be impressed by means of a pulse-width-modulation (PWM) generation unit 7 and a three-phase H-bridge inverter 8. The elements 6, 7 and 8 are conventional elements used, for example, in what is referred to as field-oriented regulation or else vector regulation. In this respect, reference is also made to the relevant technical literature.

Figure 6:
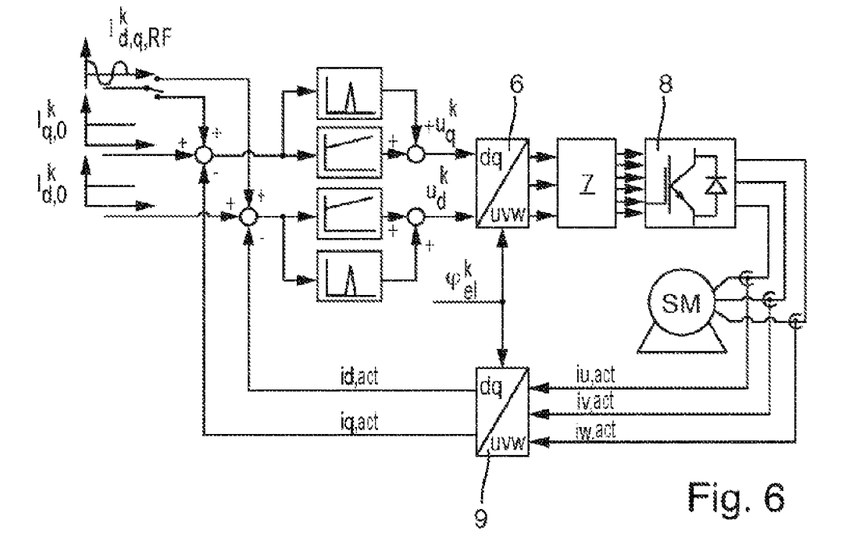
FIG. 6 shows a portion of the block circuit diagram shown in FIG. 2 in greater detail.

With reference to FIG. 6, phase currents $i_{u,act}$, $i_{v,act}$, $i_{w,act}$ of the electric machine 1 are measured by means of conventional measuring means (not shown), wherein, based on the measured phase currents $i_{u,act}$, $i_{v,act}$, $i_{w,act}$, an ensuing direct-axis current $i_{d,act}$ and an ensuing quadrature-axis current $i_{q,act}$ are determined from the measured phase currents $i_{u,act}$, $i_{v,act}$, $i_{w,act}$ by means of a conventional uvw-dq converter 9 (for example for Clarke-Parks transformation). The phase currents $i_{u,act}$, $i_{v,act}$, $i_{w,act}$ can be measured both using 3 and using 2 measuring elements, wherein, in the case of 2 measuring elements, the third phase current has to be calculated from the two other phase currents. In this respect, reference is likewise made to the relevant technical literature. The currents $i_{d,act}$ and $i_{q,act}$ are provided to the current regulation means 5 as actual values.

The current regulation means 5 can have a PI regulator and a P resonant regulator (PR regulator) connected in parallel with the PI regulator.

With reference again to FIG. 2, an identification unit 10 serves to identify characteristic variables based on the determined direct-axis current $i_d$, the determined quadrature-axis current $i_q$, the direct-axis manipulated voltage $u_d^k$, the quadrature-axis manipulated voltage $u_q^k$ and the state k.

A switch or multiplexer 15 is supplied with the direct-axis current $i_d$, the quadrature-axis current $i_q$ and the state k and, depending on the state k, outputs either the direct-axis current $i_d$ or the quadrature-axis current $i_q$ at an optional filter 11, which can be realized, for example, in the form of a bandpass. The filter 11 (or corresponding further parallel instances of the filter 11) is/are further supplied with the direct-axis manipulated voltage $u_d^k$ and the quadrature-axis manipulated voltage $u_q^k$.

A DFT unit 12 applies a discrete Fourier transform (DFT) algorithm or a Goertzel algorithm to the direct-axis manipulated voltage $u_d^k$ and/or the quadrature-axis manipulated voltage $u_q^k$, and/or the direct-axis current $i_d$ and/or the quadrature-axis current $i_q$ to generate direct-axis manipulated-voltage coefficients, quadrature-axis manipulated-voltage coefficients, direct-axis-current coefficients and quadrature-axis-current coefficients.

A calculation unit 13 finally calculates the (impedance) characteristic variables or differential inductances depending on the direct-axis manipulated-voltage coefficients and the direct-axis-current coefficients and on the quadrature-axis manipulated-voltage coefficients and the quadrature-axis-current coefficients. To this end, the calculation unit 13 can divide the direct-axis-current coefficients by the direct-axis manipulated-voltage coefficients and the quadrature-axis-current coefficients by the quadrature-axis manipulated-voltage coefficients. The flux linkages and the absolute fluxes can be calculated from the differential inductances calculated in this way. In the calculation, dead times of the inverter and different filter times, for example in the current detection, can be taken into account and compensated.

The calculated characteristic variables are stored in the database 14.

Furthermore, the determined characteristic variables can be used for the purpose of tracking the current regulation means for one of the subsequent operating points. To this end, a tracking means of the regulating parameters 16 and 17 is provided.

Furthermore, a setpoint-value sensor 19, a downstream position regulator 20 and a downstream rotational-speed regulation means 21 are provided for normal operation, wherein an output of the setpoint-value generation means 18 and an output of the rotational-speed regulation means 21 are guided to a changeover switch 22, which, depending on a braking state, gives either the output of the setpoint-value generation means 18 or the output of the rotational-speed regulation means 21 to the current regulation means 5.

Figure 3:
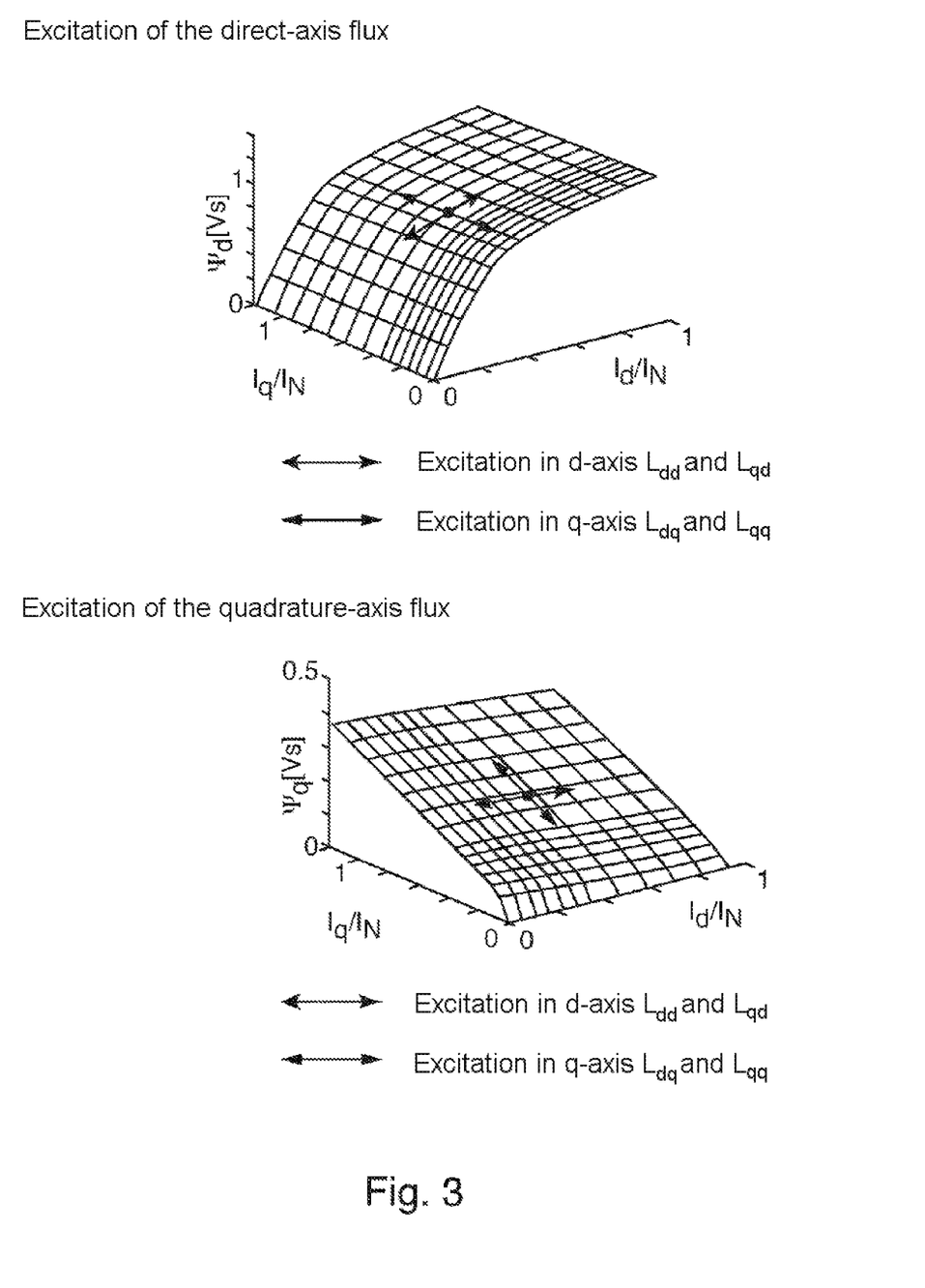
FIG. 3 shows an illustration of the principle of alternating excitation for an operating point.

FIG. 3 shows an illustration of the principle of the alternating excitation for an operating point, which will be explained in more detail below with reference to FIGS. 4 and 5.

Figure 4:
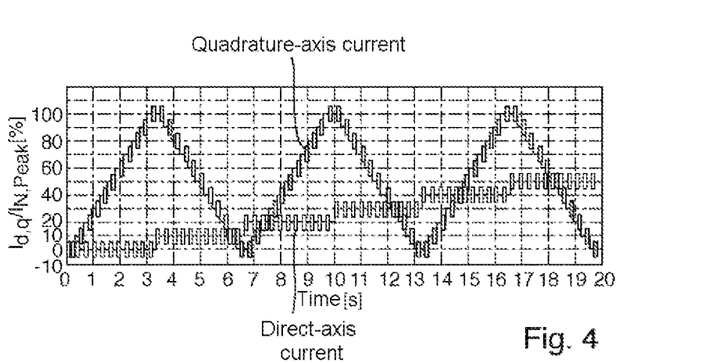
FIG. 4 shows a time profile of a direct-axis-current setpoint value and a quadrature-axis-current setpoint value.

FIG. 4 shows a time profile of the direct-axis-current setpoint value or the direct-axis current and of the quadrature-axis-current setpoint value or quadrature-axis current. The guiding of the operating points is optimized here in such a way that there is in each case only a slight difference between 2 successive operating points either in the direct-axis-current setpoint value or in the quadrature-axis-current setpoint value. This advantageously executed successive arrangement of operating points makes it possible for the measured impedances of the previous operating point to be able to be used for adaptive tracking of the regulator parameters for measuring the subsequent operating point. Machines with extreme saturation behavior and widely varying inductances can therefore also be identified in a stable, robust and reliable manner. One possible embodiment consists in first of all keeping the direct-axis-current setpoint value at the operating points constant and varying the quadrature-axis-current setpoint value from 0 up to the maximum quadrature-axis-current setpoint value that is to be identified. After the maximum quadrature-axis-current setpoint value has been reached, the direct-axis-current setpoint value is increased and the operating points for said direct-axis-current setpoint value can then be approached in the desired quadrant by gradually decrementing the quadrature-axis-current setpoint value from the maximum setpoint value to 0. All 4 quadrants of a motor can be measured in this way by a suitable successive arrangement.

The steps described further above for determining the characteristic variables are repeated in the event of changed operating points.

Furthermore, the rotational angle position can be changed and the rotor can subsequently be locked in the case of a changed rotational angle position, wherein the steps described above for determining the characteristic variables are repeated in the case of a changed rotational angle position.

Figure 5A:
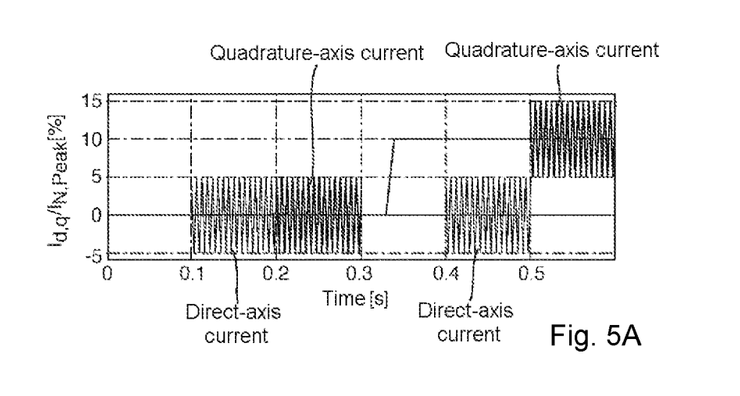
FIGS. 5A and 5B show a time profile of a state of a state controller in connection with an associated time profile of a direct-axis-current setpoint value and of a quadrature-axis-current setpoint value.
Figure 5B:
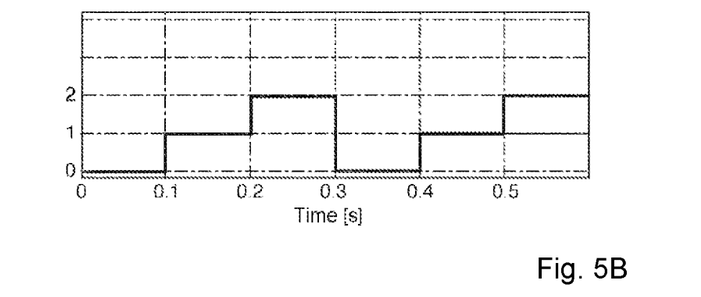

FIGS. 5A and 5B show a time profile of the state k of the state controller 3 in connection with an associated time profile of the direct-axis current or direct-axis-current setpoint value and of the quadrature-axis current or quadrature-axis-current setpoint value.

The state k initially has a value of 0, then changes its value to 1, then to 2 and back to 0. This cycle is repeated continuously.

During the first cycle, both the direct-axis-current setpoint-value operating point and the quadrature-axis-current setpoint-value operating point remain constant. In this state, the new direct-axis-current and quadrature-axis-current setpoint values of the operating point are approached. It is waited until the regulators have settled and the behavior is stationary in order to prevent undesired superposition of the on-regulation process of the operation point and the actual identification (k=1, k=2).

In the state k=0, neither the direct-axis-current setpoint-value AC signal or the quadrature-axis-current setpoint-value AC signal are generated, with the result that the direct-axis-current setpoint value and the quadrature-axis-current setpoint value remain constant as well.

In the state k=1, only the direct-axis-current setpoint-value AC signal is generated as a sinusoidal signal at a direct-axis-current setpoint-value frequency, with the result that the direct-axis-current setpoint value changes about the operating point thereof as illustrated in a sinusoidal manner at the direct-axis-current setpoint-value frequency. The quadrature-axis-current setpoint value remains constant. In the state k=1, direct-axis inductances Ldd and cross-saturations Ldq are calculated. The switch 15 (FIG. 2) and hence the calculation method 10 are only activated here after the AC signal has waited for several periods and the regulators have been able to settle. The switch is then connected for an integral number of AC signal periods.

In the state k=2, only the quadrature-axis-current setpoint-value AC signal is generated as a sinusoidal signal at a quadrature-axis-current setpoint-value frequency, with the result that the quadrature-axis-current setpoint value changes about the operating point thereof as illustrated in a sinusoidal manner at the quadrature-axis-current setpoint-value frequency. The direct-axis-current setpoint value remains constant. In the state k=2, quadrature-axis inductances Lqq and cross-saturations Lqd are calculated. The switch 15 (FIG. 2) and hence the calculation method 10 are only activated here after the AC signal has been waiting for several periods and the regulators have been able to settle. The switch is then connected for an integral number of AC signal periods.

The direct-axis-current setpoint-value frequency and the quadrature-axis-current setpoint-value frequency may be identical. The dimensioning of the frequency for the method can be selected depending on the motor to be identified and on the available manipulated voltage. Depending on the motor, said frequency may be between 100 and 600 Hz. The amplitude of the current signal can be determined depending on the resolution of the current detection means and on the current region to be measured. In general, the amplitude should be between 5-15% of the rated current of the machine.

In the subsequent cycle, as illustrated in FIGS. 5A and 5B, the quadrature-axis-current operating point is increased, wherein the direct-axis-current operating point remains constant. The second cycle otherwise corresponds to the first cycle. Finally, the time profile of the current setpoint values illustrated in FIG. 4 emerges over a longer period.

The direct-axis current and quadrature-axis current are regulated in accordance with the invention using a PI regulator connected in parallel and a PR regulator (proportional resonant regulator). The associated current setpoint values are generated using a state controller 3 in connection with a setpoint-value generation means 18. The corresponding setpoint voltages from the output of the regulator 5 and the measured currents are analyzed using the Goertzel algorithm with respect to the direct-axis-current setpoint-value frequency and/or the quadrature-axis-current setpoint-value frequency, wherein only one current component is investigated depending on the injection direction. The changeover is effected using the state-dependent switch 15.

If the measurement variables have a high level of noise, a band-pass filter 11 can be used. A band-pass filter of the $2^{nd}$ order is recommended, wherein the band-pass filter 11 is to be applied to all the measurement variables included in the calculation, with the result that the phase shift and the amplitude attenuation occur to the same extent for all variables.

The Goertzel algorithm supplies the DFT coefficients of the voltages and of the injection current.

The (differential) impedance of the machine 1 is calculated from the DFT coefficients shortly before the change in operating point (state 2→0). The identified inductances are tracked to optimize the regulation and stored in the memory 14.

The regulator parameters of the PI and the P resonant regulator are determined automatically and adaptively tracked from measuring point to measuring point by the sequence controller 3.

The test signal is dimensioned automatically.

The dead time of the inverter 8 is taken into account.

The differential inductances are calculated by a division of the DFT coefficients of current and voltage. This makes it possible for the differential inductances and the cross-couplings to be determined in a highly precise manner when taking the dead time into account.

The flux linkages and the absolute fluxes can be calculated from the differential inductances.

The P resonant regulator can be temporarily deactivated in order to make it possible to adjust the DC components of the direct-axis and quadrature-axis current in a quick and stable manner.

What is claimed is:

1. A method for determining current-dependent and/or rotational-angle-position-dependent characteristic variables of an electric machine using a control unit of a frequency converter, the method comprising the steps of:
   a) setting a rotational angle position of a rotor of the electric machine and subsequently locking the rotor;
   b) forming, using the control unit, a direct-axis-current setpoint value by adding a direct-axis-current setpoint-value operating point ($I_{d,o}^{k}$) and a direct-axis-current setpoint-value AC signal ($I_{d,RF}^{k}$), wherein the direct-axis-current setpoint-value AC signal ($I_{d,RF}^{k}$) changes periodically at a direct-axis-current setpoint-value frequency, and/or forming a quadrature-axis-current setpoint value by adding a quadrature-axis-current setpoint-value operating point ($I_{q,o}^{k}$) and a quadrature-axis-current setpoint-value AC signal ($I_{q,RF}^{k}$), wherein the quadrature-axis-current setpoint-value AC signal ($I_{q,RF}^{k}$) changes periodically at a quadrature-axis-current setpoint-value frequency;

c) regulating, using the control unit, a direct-axis current ($i_d$) of the electric machine to the direct-axis-current setpoint value and/or regulating a quadrature-axis current ($i_q$) of the electric machine to the quadrature-axis-current setpoint value, wherein, for the purpose of the regulation, manipulated variables in the form of a direct-axis manipulated voltage ($u_d^k$) and/or a quadrature-axis manipulated voltage ($u_q^k$) are generated and impressed into motor phases of the electric machine;

d) measuring, using the control unit, phase currents ($i_{u,act}$, $i_{v,act}$, $i_{w,act}$) of the electric machine and determining an ensuing direct-axis current ($i_{d,act}$) and/or an ensuing quadrature-axis current ($i_{q,act}$) from the measured phase currents ($i_{u,act}$, $i_{v,act}$, $i_{w,act}$);

e) applying, using the control unit, a discrete Fourier transform (DFT) algorithm or a Goertzel algorithm to the direct-axis manipulated voltage ($u_d^k$) and to the determined direct-axis current ($i_{d,act}$) to generate direct-axis manipulated-voltage coefficients and direct-axis-current coefficients and/or applying the DFT algorithm or the Goertzel algorithm to the quadrature-axis manipulated voltage ($u_q^k$) and to the determined quadrature-axis current ($i_{q,act}$) to generate quadrature-axis manipulated-voltage coefficients and quadrature-axis-current coefficients; and f) calculating, using the control unit, the characteristic variables depending on the direct-axis manipulated-voltage coefficients and the direct-axis-current coefficients and/or on the quadrature-axis manipulated-voltage coefficients and the quadrature-axis-current coefficients, wherein the characteristic variables are calculated depending signal propagation times of filters that serve to measure the phase currents;

g) regulating, using the control unit, the electric machine using the characteristic values in a manner which improves electric machine operating efficiency, improves electric machine power regulation, checks electric machine properties, improves feed-forward control of the direct-axis current setpoint-value, improves feed-forward control of the quadrature-axis current setpoint-value, or a combination of two or more of the foregoing uses of the characteristic values, wherein the direct-axis current ($i_d$) is regulated to the direct-axis-current setpoint value and/or the quadrature-axis current ($i_q$) is regulated to the quadrature-axis-current setpoint value based on regulation parameters of a PI or a PI-P resonant regulator, which are dependent on the direct-axis-current setpoint-value operating point and/or the quadrature-axis-current setpoint-value operating point.

2. The method as claimed in claim 1, wherein
in step b), the direct-axis-current setpoint-value operating point is changed and/or the quadrature-axis-current setpoint-value operating point is changed, wherein steps c) to f) are repeated in the case of a changed direct-axis-current setpoint-value operating point and/or in the case of a changed quadrature-axis-current setpoint-value operating point.

3. The method as claimed in claim 2, wherein
the direct-axis-current setpoint-value operating point and/or the quadrature-axis-current setpoint-value operating point is/are continuously changed in such a way that a change in the direct-axis current and/or in the quadrature-axis current does not exceed a threshold value.

4. The method as claimed in claim 2, wherein
the direct-axis current ($i_d$) is regulated to the direct-axis-current setpoint value and/or the quadrature-axis current ($i_q$) is regulated to the quadrature-axis-current setpoint value based on regulation parameters, which are dependent on the direct-axis-current setpoint-value operating point and/or the quadrature-axis-current setpoint-value operating point.

5. The method as claimed in claim 4, wherein
the direct-axis-current setpoint-value operating point and/or the quadrature-axis-current setpoint-value operating point is/are continuously changed in such a way that a change in the direct-axis current and/or in the quadrature-axis current does not exceed a threshold value.

6. The method as claimed in claim 1, wherein
in step a), the rotational angle position is changed and the rotor is subsequently locked in the case of a changed rotational angle position, wherein steps b) to f) are repeated in the case of a changed rotational angle position.

7. The method as claimed in claim 1, wherein
the current-dependent and/or the rotational-angle-position-dependent characteristic variables are selected from a group of characteristic variables comprising:
differential direct-axis inductances,
differential quadrature-axis inductances,
cross-saturation,
resistances and
impedances.

8. The method as claimed in claim 7, further comprising the step of:
calculating current-dependent and/or location-dependent flux linkages in the direct-axis direction and in the quadrature-axis direction from the calculated differential direct-axis inductances and quadrature-axis inductances and from the calculated cross-saturation, in permanent-magnet synchronous machines, taking into account the flux linkage in the direct-axis direction effected by the permanent magnets thereof.

9. The method as claimed in claim 8, further comprising the step of:
determining current-dependent and/or location-dependent absolute inductances in the direct-axis direction and the quadrature-axis direction from the flux linkages in the direct-axis direction and the quadrature-axis direction and from the associated direct-axis current ($i_d$) and quadrature-axis current ($i_q$).

10. The method as claimed in claim 1, wherein
the direct-axis current ($i_d$) and quadrature-axis current ($i_q$) obtained from the measurement of the phase currents are filtered.

11. The method as claimed in claim 1, wherein
the electric machine is a synchronous machine, a reluctance machine or an induction machine.

12. The method as claimed in claim 1, wherein
the direct-axis-current setpoint-value operating point and/or the quadrature-axis-current setpoint-value operating point is/are continuously changed in such a way that a change in the direct-axis current and/or in the quadrature-axis current does not exceed a threshold value.

13. A frequency converter of an electric machine, comprising:
a control unit, which is configured to execute a method comprising the steps of:
a) setting a rotational angle position of a rotor of the electric machine and subsequently locking the rotor;
b) forming a direct-axis-current setpoint value by adding a direct-axis-current setpoint-value operating point ($I_{d,o}^k$) and a direct-axis-current setpoint-value AC signal ($I_{d,RF}^k$), wherein the direct-axis-current setpoint-value AC signal ($I_{d,RF}{}^k$) changes periodically at a direct-axis-current setpoint-value frequency, and/or forming a quadrature-axis-current setpoint value by adding a quadrature-axis-current setpoint-value operating point ($I_{q,O}{}^k$) and a quadrature-axis-current setpoint-value AC signal ($I_{q,RF}{}^k$), wherein the quadrature-axis-current setpoint-value AC signal ($I_{q,RF}{}^k$) changes periodically at a quadrature-axis-current setpoint-value frequency;

c) regulating a direct-axis current ($i_d$) of the electric machine to the direct-axis-current setpoint value and/or regulating a quadrature-axis current ($i_q$) of the electric machine to the quadrature-axis-current setpoint value, wherein, for the purpose of the regulation, manipulated variables in the form of a direct-axis manipulated voltage ($u_d{}^k$) and/or a quadrature-axis manipulated voltage ($u_q{}^k$) are generated and impressed into motor phases of the electric machine;

d) measuring phase currents ($i_{u,act}$, $i_{v,act}$, $i_{w,act}$) of the electric machine and determining an ensuing direct-axis current ($i_{d,act}$) and/or an ensuing quadrature-axis current ($i_{q,act}$) from the measured phase currents ($i_{u,act}$, $i_{v,act}$, $i_{w,act}$);

e) applying a discrete Fourier transform (DFT) algorithm or a Goertzel algorithm to the direct-axis manipulated voltage ($u_d{}^k$) and to the determined direct-axis current ($i_{d,act}$) to generate direct-axis manipulated-voltage coefficients and direct-axis-current coefficients and/or applying the DFT algorithm or the Goertzel algorithm to the quadrature-axis manipulated voltage ($u_q{}^k$) and to the determined quadrature-axis current ($i_{q,act}$) to generate quadrature-axis manipulated-voltage coefficients and quadrature-axis-current coefficients; and f) calculating the characteristic variables depending on the direct-axis manipulated-voltage coefficients and the direct-axis-current coefficients and/or on the quadrature-axis manipulated-voltage coefficients and the quadrature-axis-current coefficients, wherein the characteristic variables are calculated depending on signal propagation times of filters that serve to measure the phase currents;

g) regulating, using the control unit, the electric machine using the characteristic values in a manner which improves electric machine operating efficiency, improves electric machine power regulation, checks electric machine properties, improves feed-forward control of the direct-axis current setpoint-value, improves feed-forward control of the quadrature-axis current setpoint-value, or a combination of two or more of the foregoing uses of the characteristic values, wherein the direct-axis current ($i_d$) is regulated to the direct-axis-current setpoint value and/or the quadrature-axis current ($i_q$) is regulated to the quadrature-axis-current setpoint value based on regulation parameters of a PI or a PI-P resonant regulator, which are dependent on the direct-axis-current setpoint-value operating point and/or the quadrature-axis-current setpoint-value operating point.

* * * * *